United States Patent
Tsuji

(10) Patent No.: US 7,280,291 B2
(45) Date of Patent: Oct. 9, 2007

(54) LENS BARREL

(75) Inventor: Kanji Tsuji, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/460,131

(22) Filed: Jul. 26, 2006

(65) Prior Publication Data

US 2007/0024988 A1 Feb. 1, 2007

(30) Foreign Application Priority Data

Jul. 26, 2005 (JP) .............................. 2005-216062

(51) Int. Cl.
G02B 7/02 (2006.01)
(52) U.S. Cl. .................... 359/819; 359/817; 359/811
(58) Field of Classification Search ................ 359/811, 359/813, 814, 817, 819, 821, 822, 823, 826, 359/829
See application file for complete search history.

(56) References Cited

U.S. PATENT DOCUMENTS

2006/0044457 A1* 3/2006 Yasui et al. ................. 348/360

* cited by examiner

Primary Examiner—Timothy Thompson
(74) Attorney, Agent, or Firm—Rossi, Kimms & McDowell, LLP

(57) ABSTRACT

There is provided a lens barrel on which a flexible substrate having mounted thereon an image pickup element for photoelectrically converting an optical image imaged by a photo-taking lens is mounted, having a plurality of lens barrel members disposed movable forward and backward in the direction of an optical axis, and moving the photo-taking lens between a stored position which is the image pickup element side in the direction of the optical axis and a photographing position which is an object side in the direction of the optical axis, and an image pickup element supporting unit for supporting the image pickup element, and having a notched portion so that at least one of the plurality of lens barrel members may face the flexible substrate.

4 Claims, 19 Drawing Sheets

LENS BARREL

BACKGROUND OF THE INVENTION

1. Field of the Invention

The present invention relates to a lens barrel capable of moving a photo-taking lens between a stored position and a photographing position, and an image pickup apparatus provided with the lens barrel.

2. Related Background Art

Conventionally, a camera is known which is provided with an image pickup element for photoelectrically converting the optical image of an object imaged through a photo-taking lens into an electrical signal, and a lens barrel capable of moving the photo-taking lens to a photographic position and a stored position, and made to have a compact configuration by the photo-taking lens being moved to the stored position during non-photographing. In such camera, the image pickup element is disposed in the imaging plane of the lens barrel, and provision is made of connecting means and fixing means for connecting the image pickup element to a signal processing circuit (For example, Japanese Patent Application Laid-open No. 2001-337260 (FIG. 1) and Japanese Patent No. 3399285 (FIG. 4)).

Description will first be made of the constructions of a conventional lens barrel and an image pickup element described in Japanese Patent Application Laid-open No. 2001-337260. The reference characters in the following are reference characters used in Japanese Patent Application Laid-open No. 2001-337260.

The structure of a lens barrel unit is constructed together with a fixed cylinder 2 fixed to the front end portion of a base 1 which is the base of the lens barrel unit by screwing. A movable cam ring 34 is located inside the fixed cylinder 2, and a rectilinear guide cylinder 42 is fitted to the interior of the movable cam ring 34. The rectilinear guide cylinder 42 and the movable cam ring 34 are rotatable with respect to each other, and are yet integrally moved in the direction of an optical axis. At this time, a projection 42c provided on the rear end portion of the rectilinear guide cylinder 42 fits in a groove 2c formed in the fixed cylinder 2 so that the rectilinear guide cylinder 42 may not rotate relative to the fixed cylinder 2. A first unit lens barrel 3 is located inside the rectilinear guide cylinder 42, and the first unit lens barrel 3 is moved back and forth in the direction of the optical axis by the rotation of the movable cam ring 34.

An image pickup element 29 is fixed to and held on a holding plate 30 fixed to the base 1 by screwing. The image pickup element 29 is soldered to a flexible substrate 31, and supplies a photoelectrically converted image signal to a signal processing circuit. Thus, design is made such that the image pickup element 29 and the signal processing circuit are connected together by the flexible substrate 31 disposed on the rear end side of the base 1.

Description will now be made of the constructions of a conventional lens barrel and an image pickup element described in Japanese Patent No. 3399285. The reference characters in the following are reference characters used in Japanese Patent No. 3399285.

A photographing block 30 is constituted by a photo-taking lens 31 for imaging the optical image of an object, a second movable cylinder 32 and a first movable cylinder 33 corresponding to a lens barrel for holding the photo-taking lens 31, a fixed cylinder 34 disposed outside the first movable cylinder 33 and holding the first movable cylinder 33, etc. In the interior of the fixed cylinder 34, there is provided a CCD package 35 constituted by a CCD which is a kind of photoelectric converting element for converting the optical image imaged through the photo-taking lens 31 into an electrical signal.

This CCD package 35 is formed into a square shape, and is constituted by a CCD 35a disposed on the central portion of the surface thereof, a silicon base portion 35b, and a mounting stand 35c for holding the silicon base portion 35b thereon. The fixed cylinder 34 is mounted on a fixed plate 36 from the back side thereof. Also, design is made such that the mounting stand 35c of the CCD package 35 is mounted on the fixed plate 36.

However, in the conventional example described in the above-mentioned Japanese Patent Application Laid-open No. 2001-337260, design is made such that the fixed cylinder 2 constituting the lens barrel unit is fixed to the front end side of the base 1, and the image pickup element 29 and the signal processing circuit are connected together by the flexible substrate 31 disposed on the rear end side of the base 1. Because of such construction, the movable cam ring 34 and the rectilinear guide cylinder 42 cannot be moved (retracted) to the rear end side of the front end portion of the base 1 in a retracted position (stored position) in the most deeply retracted state. Further, the projection 42c is disposed on the rear end portion of the rectilinear guide cylinder 42 so that the rectilinear guide cylinder itself may not rotate relative to the fixed cylinder 2 and therefore, the rectilinear guide cylinder 42 cannot be retracted to the rear end side of the front end portion of the base 1. This has led to the problem that the retracted length of the lens barrel cannot be shortened.

Also, in the conventional example described in the above-mentioned Japanese Patent No. 3399285, design is made such that the fixed cylinder 34 and the CCD package 35 are mounded on the fixed plate 36 and therefore, in the structure wherein the CCD package 35 is mounted on and fixed to the fixed plate 36, the CCD package 35 cannot be moved in the direction of the optical axis. This has led to the problem that it is difficult to correct the deviation of an imaging position due to the manufacturing error or the like of the lens barrel.

SUMMARY OF THE INVENTION

The object of the present invention is to provide a lens barrel and an image pickup apparatus in which the retracted length of the lens barrel is shortened, whereby the deviation of an imaging position due to the manufacturing error or the like of the lens barrel is made easily correctable.

In order to achieve the above object, the present invention in a first mode thereof provides a lens barrel on which a flexible substrate having mounted thereon an image pickup element for photoelectrically converting an optical image imaged by a photo-taking lens is mounted, including:

a lens barrel member disposed movable forward and backward in the direction of an optical axis, and moving the photo-taking lens between a stored position which is the image pickup element side in the direction of the optical axis and a photographing position which is an object side in the direction of the optical axis; and an image pickup element supporting unit for supporting the image pickup element, and having a notched portion so that the lens barrel member may face the flexible substrate.

According to the present invention, since at least one of the plurality of lens barrel members is retracted to a position adjacent to the flexible substrate on the rear end side of the lens barrel in the direction of the optical axis in the stored position of the photo-taking lens, it becomes possible to shorten the retracted length which is the length of the lens barrel in the stored state in the direction of the optical axis. Also, a recess is disposed in the lens barrel member and therefore, it becomes possible to secure a space in which the flexible substrate is movable in the direction of the optical axis, and it becomes possible to easily correct the deviation of an imaging position due to the manufacturing error or the like of the lens barrel.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENT

A preferred embodiment of the present invention will hereinafter be described in detail with reference to the drawings.

Figure 1:
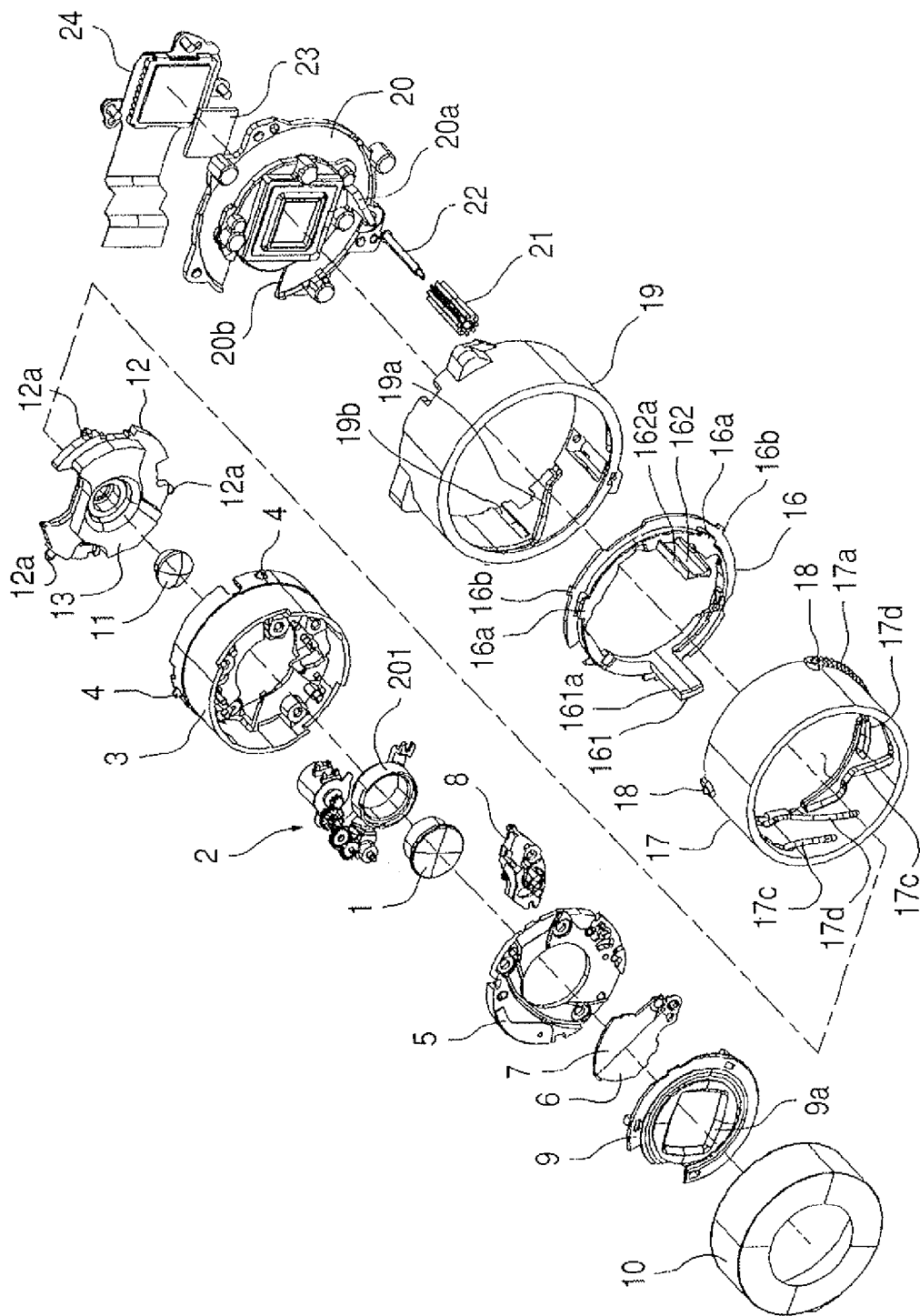
FIG. 1 is an exploded perspective view showing the construction of a lens barrel according to an embodiment of the present invention.
Figure 2:
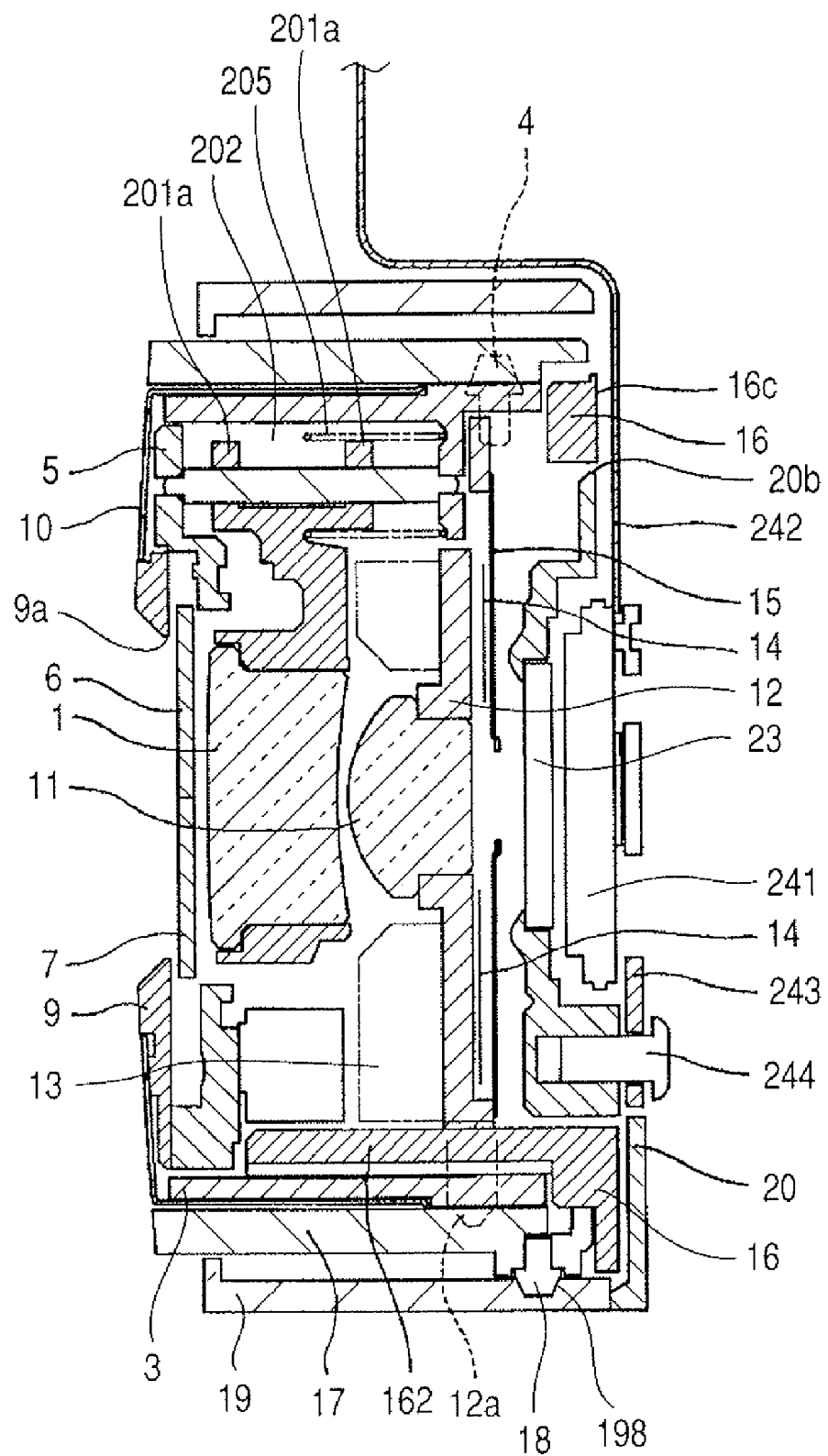
FIG. 2 is a schematic cross-sectional view showing the lens barrel in a stored state (retracted state).
Figure 3:
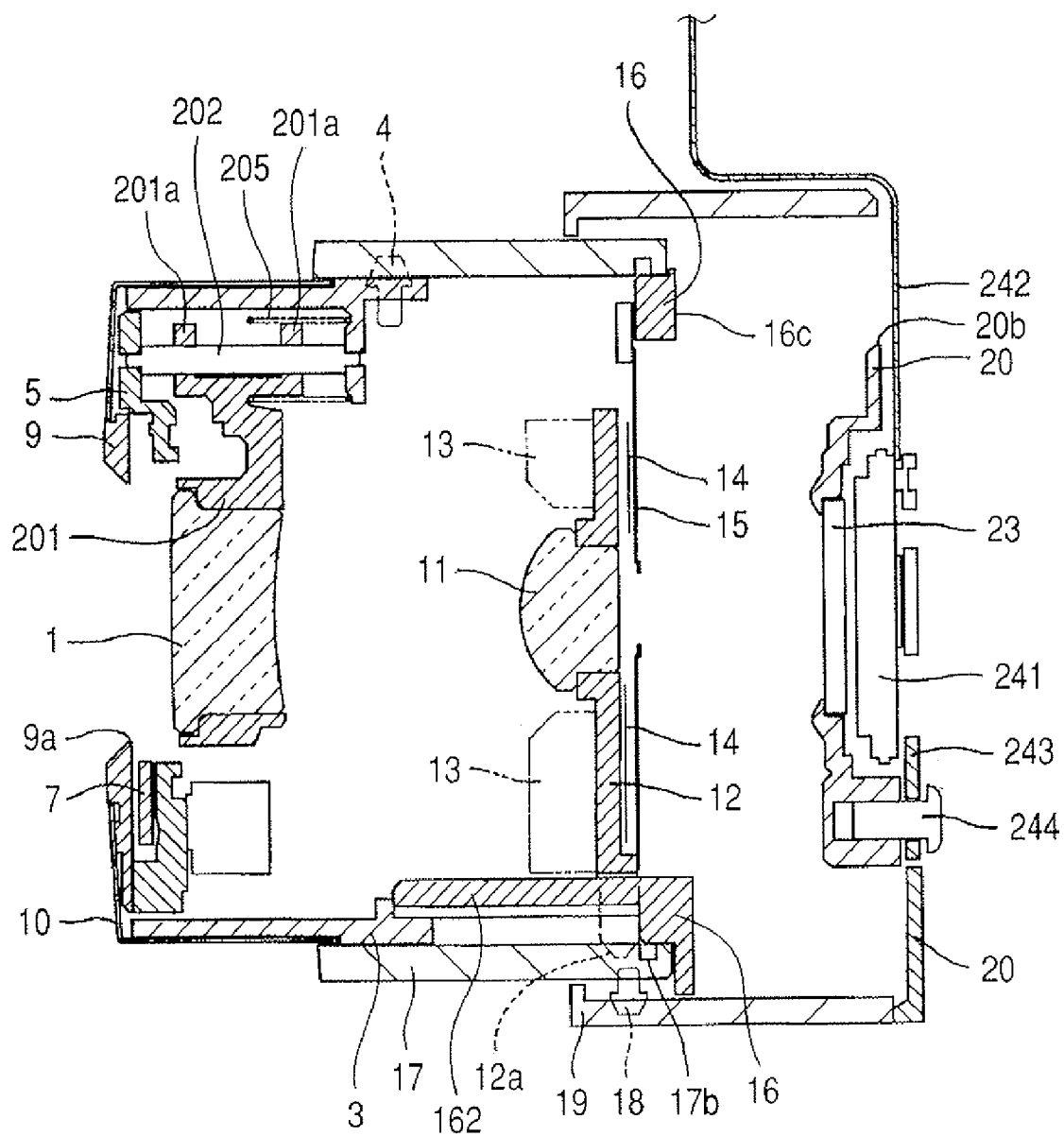
FIG. 3 is a schematic cross-sectional view showing the lens barrel in the WIDE state which is a photographing state.
Figure 4:
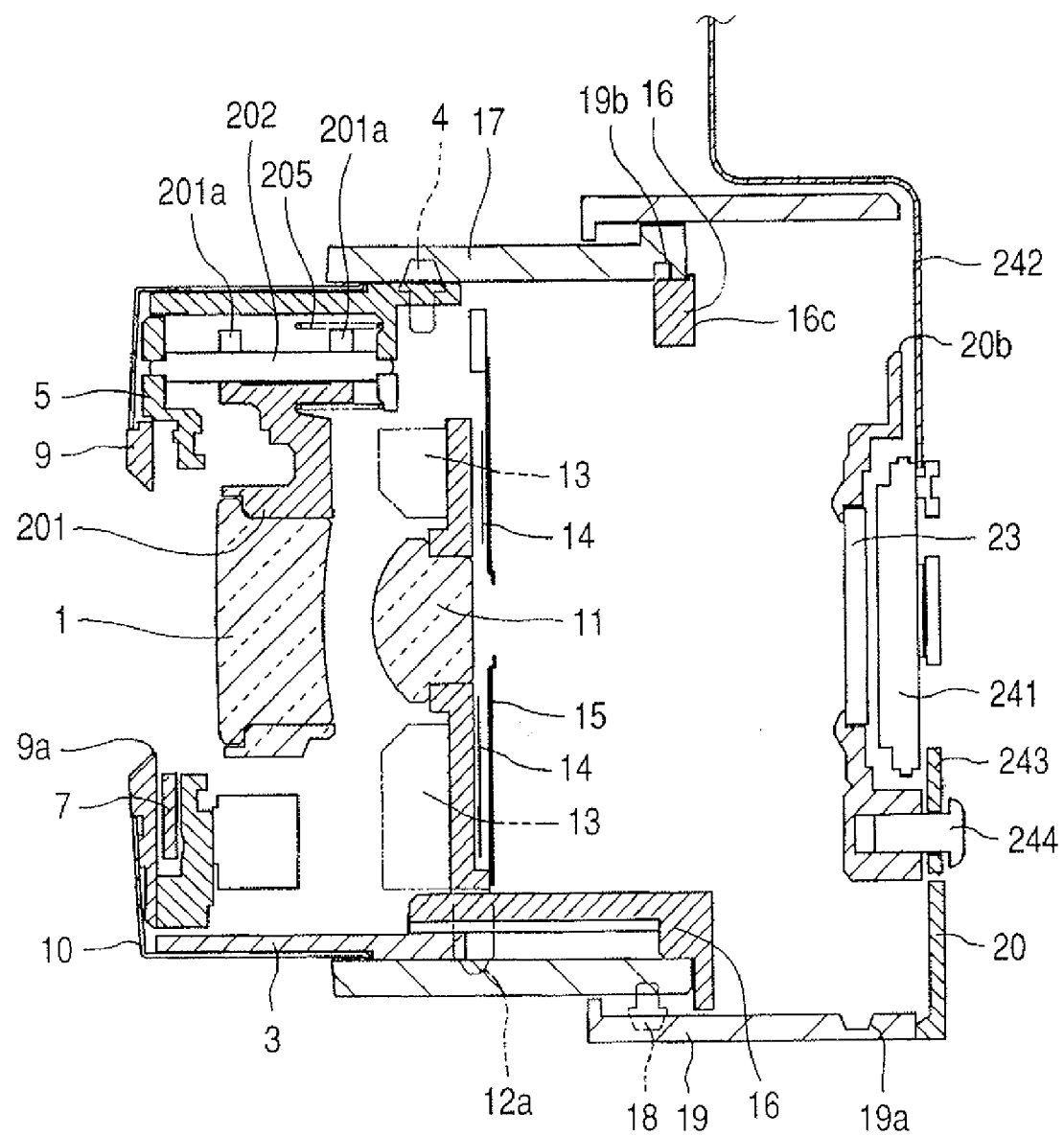
FIG. 4 is a schematic cross-sectional view showing the lens barrel in the TELE state which is photographing state.

FIG. 1 is an exploded perspective view showing the construction of a lens barrel according to the embodiment of the present invention. FIG. 2 is a schematic cross-sectional view showing the lens barrel in a stored state (retracted state). FIG. 3 is a schematic cross-sectional view showing the lens barrel in the WIDE (WIDE ANGLE side) state which is a photographing state. FIG. 4 is a schematic cross-sectional view showing the lens barrel in the TELE (TELESCOPE side) state which is a photographing state.

The general construction of the lens barrel will first be described with reference to FIGS. 1 to 4. The lens barrel includes a first lens unit 1, a first unit lens driving portion 2, a forwardly and backwardly movable cylinder 3, a first base plate member 5, a second lens unit 11, a second lens holding member 12, a rectilinear guide member 16, a cam cylinder 17, a fixed cylinder 19, a fixed base plate member 20, etc.

Figure 7:
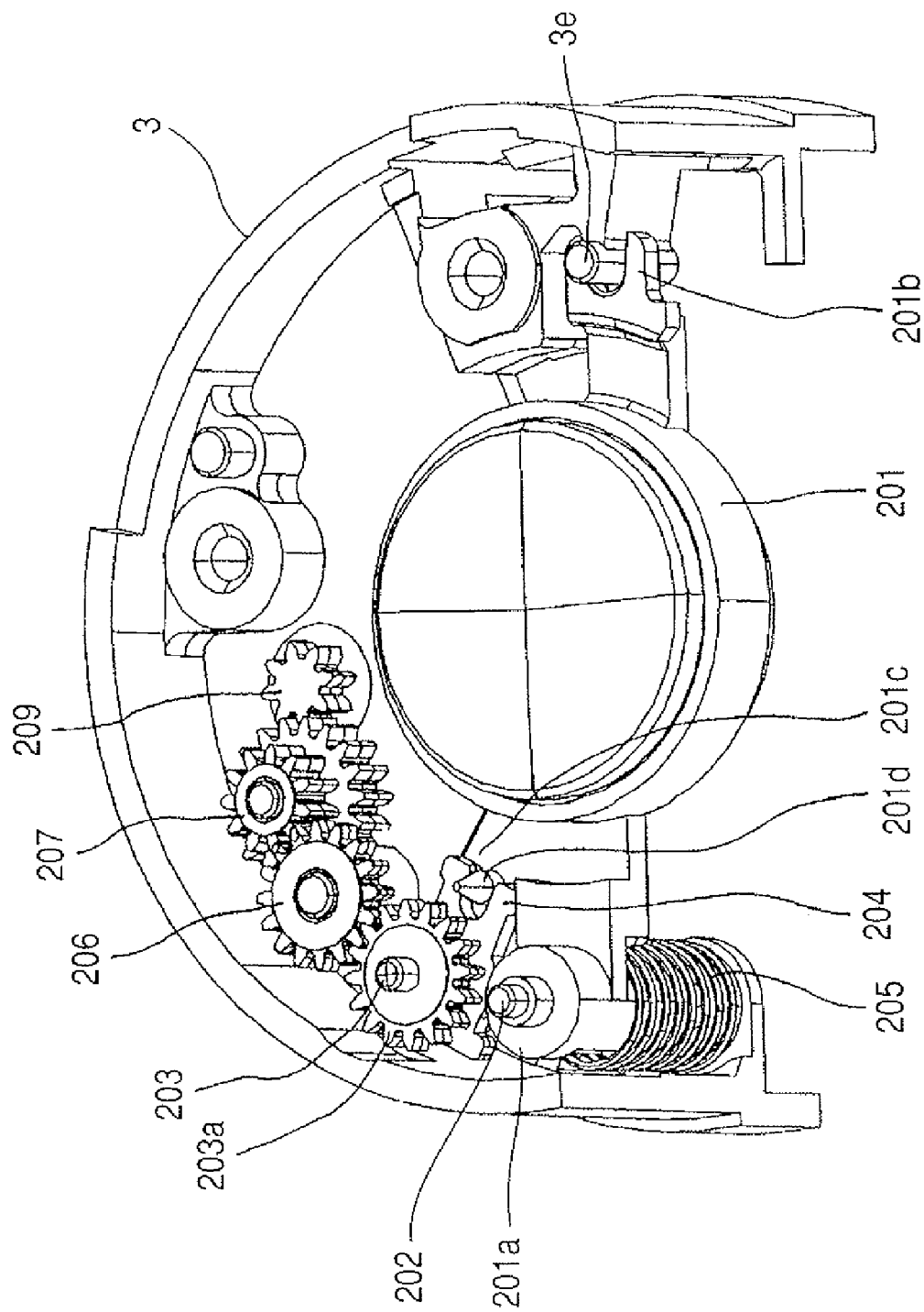
FIG. 7 is a perspective view showing a state in which a first unit lens driving portion of the lens barrel is mounted on the forwardly and backwardly movable cylinder.
Figure 8:
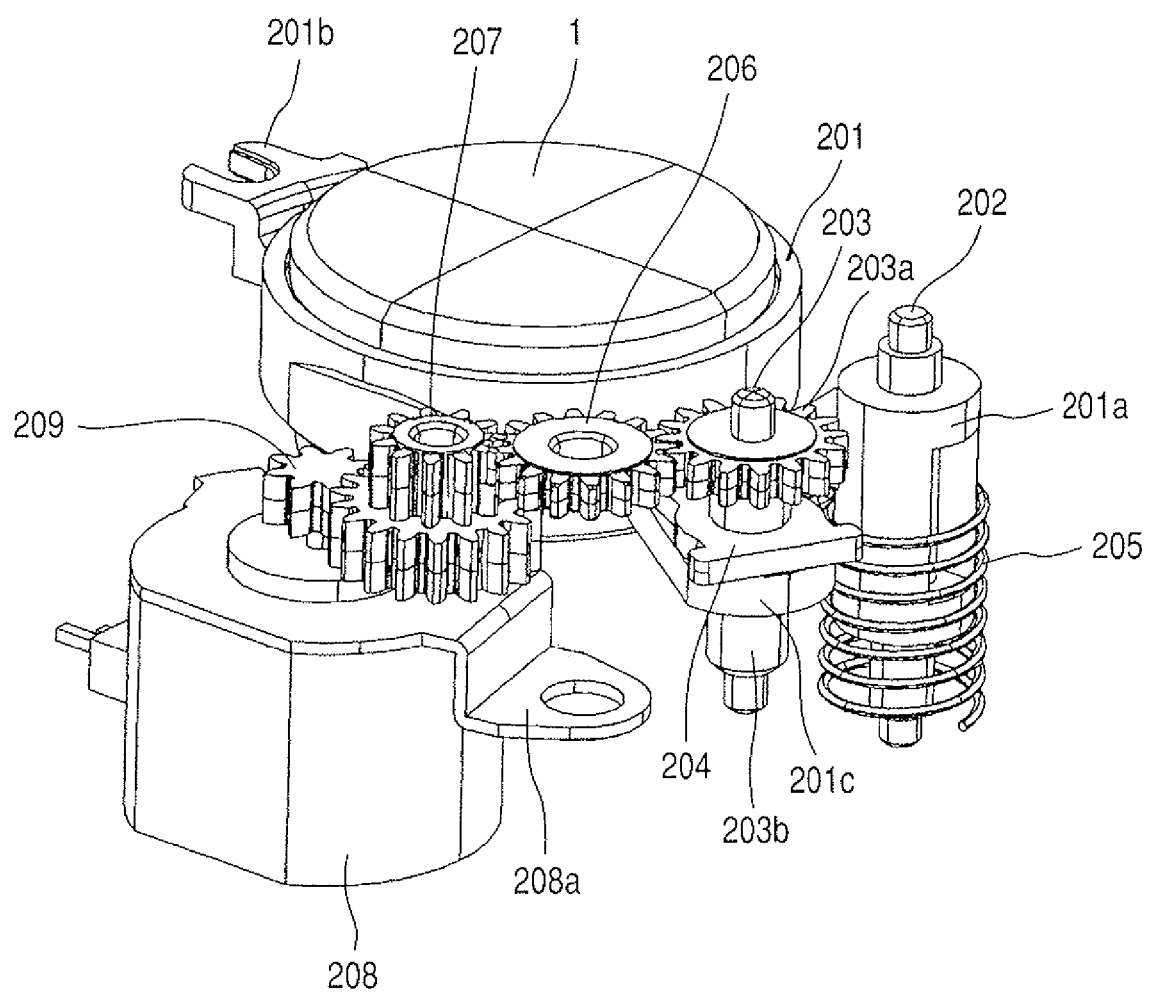
FIG. 8 is a perspective view of the first unit lens driving portion as it is viewed from another direction.

The first lens unit 1 is a photo-taking lens. The first unit lens driving portion (focus driving portion) 2 includes a mechanism portion constituted by a plurality of gear members and a stepping motor or the like, and a cylindrical first lens holding member 201 for holding the first lens unit 1. The detailed construction of the first unit lens driving portion 2 will be described later (FIGS. 7 and 8). The forwardly and backwardly movable cylinder (first forwardly and backwardly movable cylinder) 3 is roughly formed into a cylindrical shape, and has the first unit lens driving portion 2 mounted on the inner peripheral portion thereof. Three cam followers 4 are press-fitted into and fixed to the outer peripheral portion of the forwardly and backwardly movable cylinder 3 at even intervals in the peripheral direction. The detailed construction of the forwardly and backwardly movable cylinder 3 will be described later with reference to FIG. 5.

Figure 9:
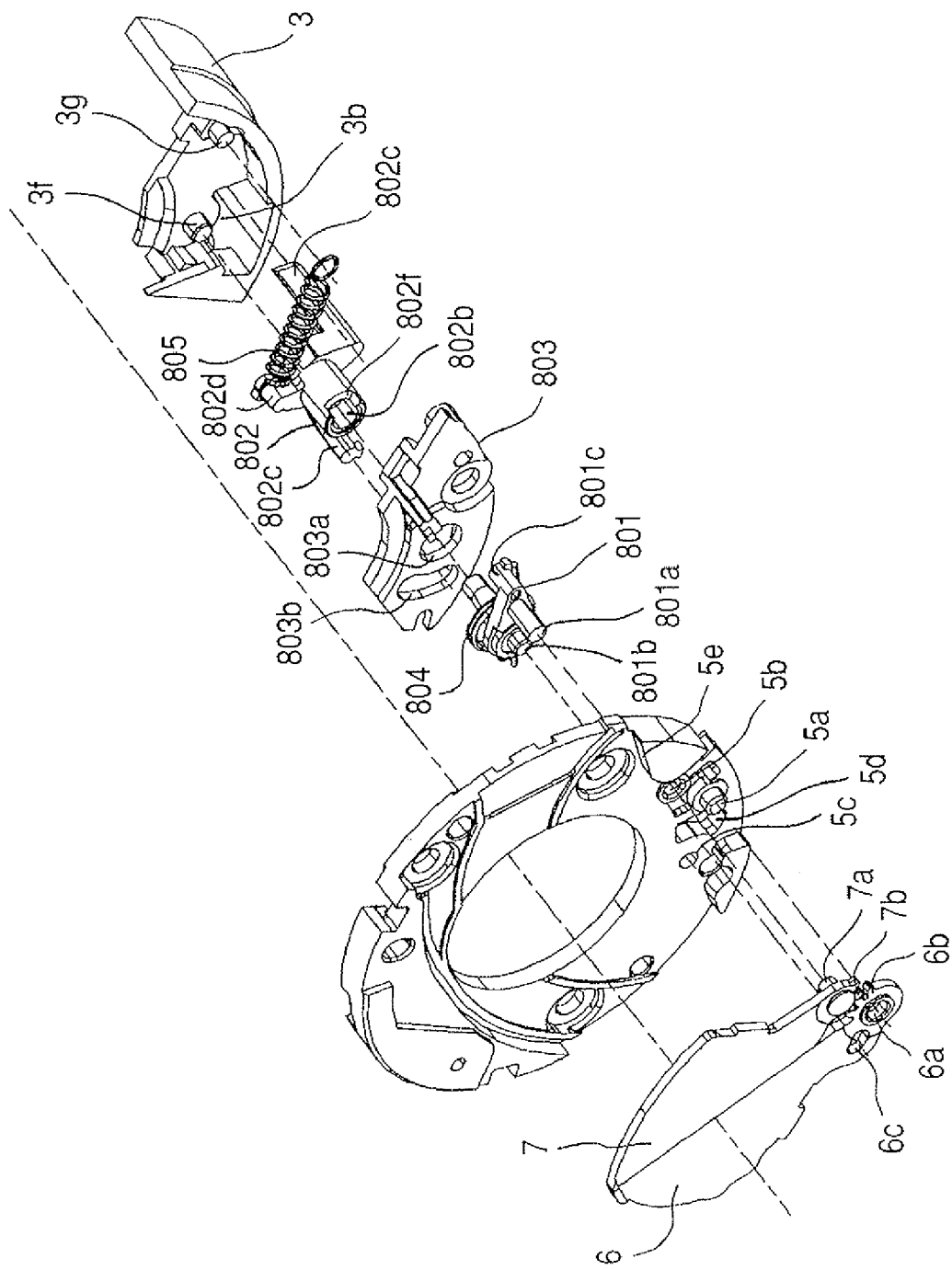
FIG. 9 is an exploded perspective view showing the detailed construction of the barrier driving portion of the lens barrel.

The first base plate member 5 is roughly formed into a circular ring shape and is mounted on the forwardly and backwardly movable cylinder 3, and includes a shaft portion 5a, an aperture portion 5b, an aperture portion 5c, a slot portion 5d and a convex portion 5e (see FIG. 9). A barrier member 6 and a barrier member 7 are mounted on the first base plate member 5 pivotally in a plane crossing the direction of an optical axis, and the closing and opening operations thereof are performed by a barrier driving portion 8. The barrier member 6 includes an aperture portion 6a, a gear portion 6b and a slot portion 6c, and the barrier member 7 includes a shaft portion 7a and a gear portion 7b (see FIG. 9). The detailed constructions of the first base plate member 6 and the barrier members 6 and 7 will be described later with reference to FIG. 9.

The barrier driving portion 8 is mounted on and fixed to the forwardly and backwardly movable cylinder 3 and the first base plate member 5, and drives to open and close the barrier member 6 and the barrier member 7. The detailed construction of the barrier driving portion 8 will be described later with reference to FIGS. 9 and 10. A cover member 9 has an opening portion 9a and is disposed on the front surface side of the lens barrel, and is a member covering the front surfaces of the barrier members 6 and 7. A cap member 10 is formed into a cylindrical shape, and is a member covering the cover member 9.

The second lens unit 11 is a photo-taking lens. The second lens holding member (second forwardly and backwardly movable cylinder) 12 holds the second lens unit 11, and three cam followers 12*a* are formed on the outer peripheral portion of the second lens holding member at even intervals in the circumferential direction. A stop and shutter driving portion 13 is mounted on the second lens holding member 12. The detailed constructions of the second lens holding member 12 and the stop and shutter driving portion 13 will be described later with reference to FIG. 6. A stop and shutter member 14 is mounted on the second lens holding member 12, and is designed to be openable and closable by the stop and shutter driving portion 13. A cover member 15 is a member covering the stop and shutter member 14.

The rectilinear guide member 16 is roughly formed into a circular ring shape, and is disposed inside the forwardly and backwardly movable cylinder 3. Protruding portions 161 and 162 for guiding (rectilinearly guiding) the forwardly and backwardly movable cylinder (first forwardly and backwardly movable cylinder) 3 and the second lens holding member (second forwardly and backwardly movable cylinder) 12 in the direction of the optical axis are disposed on the rectilinear guide member 16 in a direction orthogonal to the circular ring portion thereof. Further, convex portions 16*a* and 16*b* are disposed on the rectilinear guide member 16 in the circumferential direction thereof, and a recess 16*c* (see FIG. 11) opposed to a CCD flexible substrate which will be described later is disposed on the rear end surface of the rectilinear guide member 16.

The protruding portions 161 and 162 of the rectilinear guide member 16 are disposed at an angle within 180 degrees about the optical axis of the rectilinear guide member 16. Rectilinear guide surfaces 161*a* and 161*b* are disposed on the protruding portion 161, and rectilinear guide surfaces 162*a* and 162*b* are disposed on the protruding portion 162. The rectilinear guide surfaces 161*b* and 162*b* are surfaces opposed to the rectilinear guide surfaces 161*a* and 162*a*, respectively, but are hidden in FIG. 1.

The cam cylinder 17 is formed into a cylindrical shape, and is formed with a gear portion 17*a* on the outer peripheral portion thereof, and has disposed on the inner peripheral portion thereof concentric groove portions 17*b* engaged with the convex portion 16*a* of the rectilinear guide member 16. The rectilinear guide member 16 is disposed on the inner peripheral portion of the cam cylinder 17, and the cam cylinder 17 and the rectilinear guide member 16 are configured to be rotatable relative to each other. Also, cam portions 17*c* and 17*d* cam-coupled to the cam follower 4 of the forwardly and backwardly movable cylinder 3 and the cam follower portion 12*a* of the second lens holding member 12 are disposed on the inner peripheral portion of the cam cylinder 17. Further, three cam followers 18 are press-fitted into and fixed to the outer peripheral portion of the cam cylinder 17 at even intervals in the circumferential direction thereof.

The fixed cylinder 19 is roughly formed into a cylindrical shape, and has disposed thereon a cam portion 19*a* cam-coupled to the cam follower 18 of the cam cylinder 17 and a rectilinear guide groove portion 19*b* engaged with the convex portion 16*b* of the rectilinear guide member 16. The fixed base plate member 20 is fixed to the fixed cylinder 19 by screwing, and has disposed thereon a barrier cam portion 20*a* against which the lever arm portion 802*e* of the barrier driving portion 8 which will be described later abuts, and a notched portion 20*b* for making the CCD flexible substrate which will be described later movable in the direction of the optical axis.

A gear member 21 is constituted by a gear portion and a shaft hole portion, and meshes with the gear portion 17*a* of the cam cylinder 17. A rotary shaft member 22 is fitted to the shaft hole portion of the gear member 21, and is fixed to the fixed cylinder 19. An optical member 23 is mounted on the fixed base plate member 20. A CCD unit 24 is constituted by a CCD, a CCD flexible substrate, etc., and is screwed to the fixed base plate member 20. The detailed construction of the CCD unit 24 will be described later with reference to FIG. 11. The fixed base plate member 20 is fixed to a camera main body, not shown.

Figure 5:
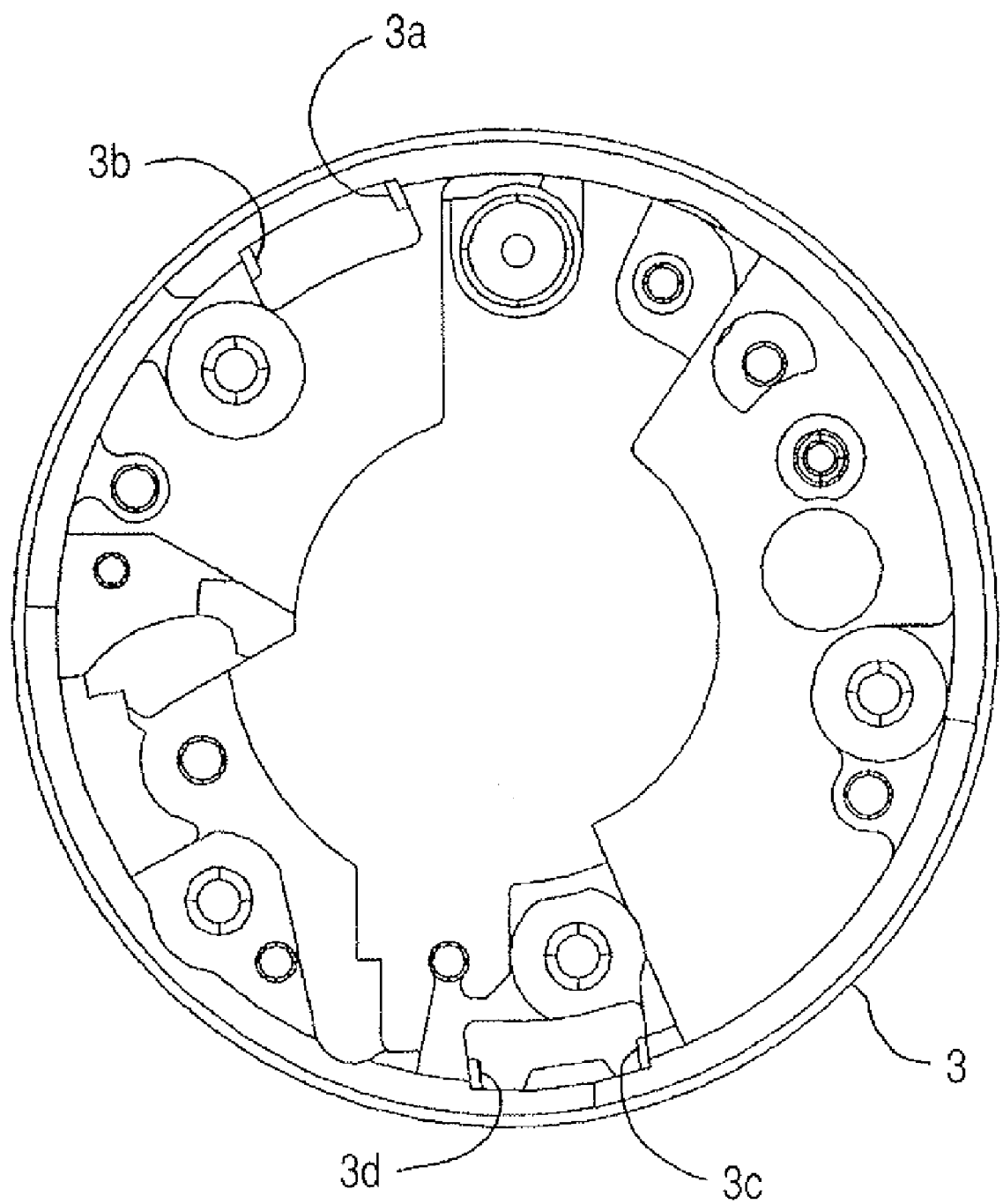
FIG. 5 is a front view showing the construction of the forwardly and backwardly movable cylinder of the lens barrel.

FIG. 5 is a front view showing the construction of the forwardly and backwardly movable cylinder 3 of the lens barrel.

In FIG. 5, rectilinear guide portions 3*a*, 3*b*, 3*c* and 3*d* are disposed on the inner peripheral portion of the forwardly and backwardly movable cylinder 3. The rectilinear guide portions 3*a* and 3*b* are key-coupled to the rectilinear guide surfaces 161*a* and 161*b*, respectively, of the protruding portion 161 of the rectilinear guide member 16. The rectilinear guide portions 3*c* and 3*d* are key-coupled to the rectilinear guide surfaces 162*a* and 162*b*, respectively, of the protruding portion 162.

Figure 6:
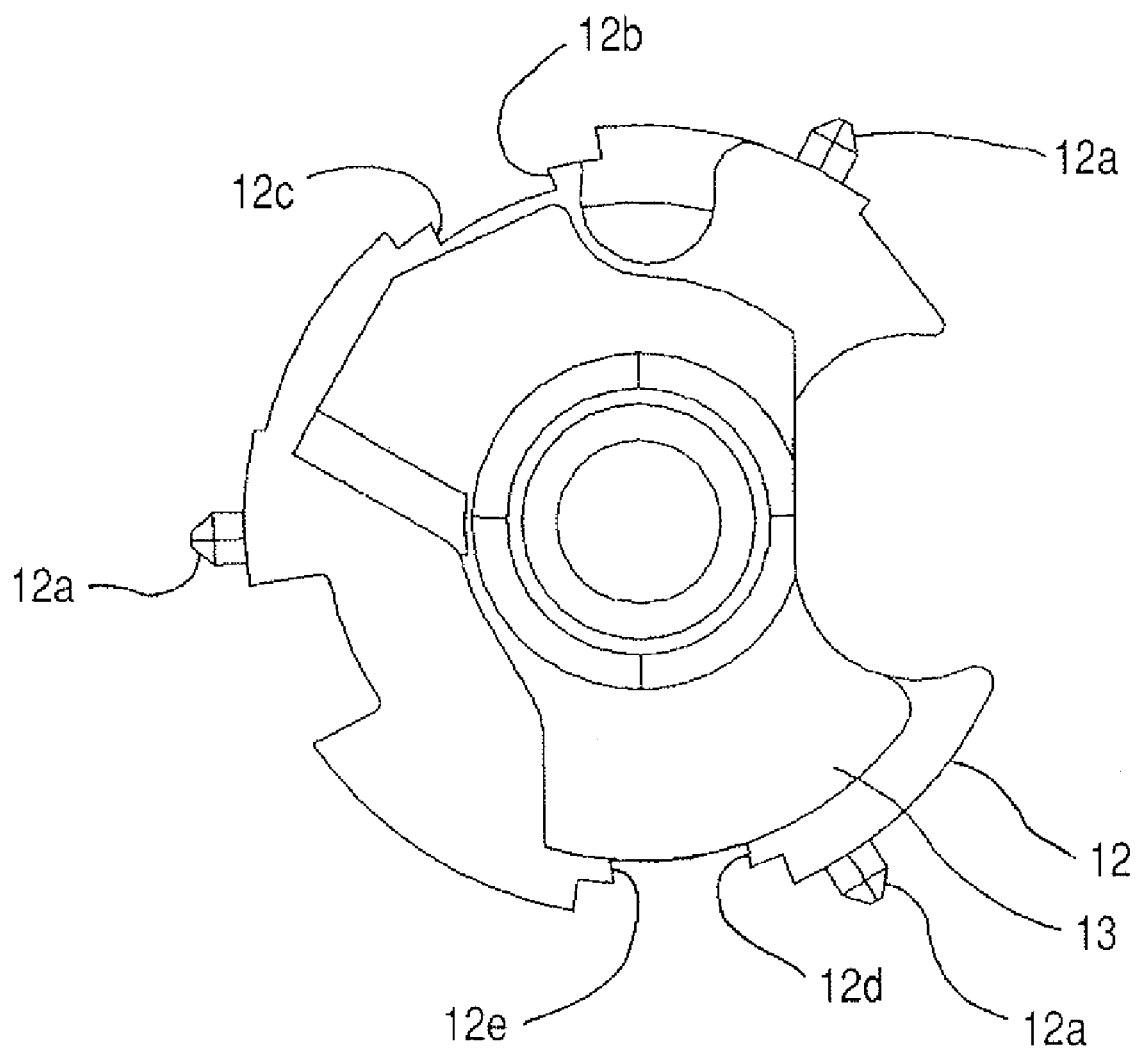
FIG. 6 is a front view showing the constructions of a second lens holding member of the lens barrel and a stop and shutter driving portion.

FIG. 6 is a front view showing the constructions of the second lens holding member 12 and the stop and shutter driving portion 13 of the lens barrel.

In FIG. 6, on the outer peripheral portion of the second lens holding member 12, there are disposed rectilinear guide portions 12*b*, 12*c*, 12*d* and 12*e*, besides the above-mentioned cam follower portion 12*a*. The rectilinear guide portion 12*b* and 12*c* are key-coupled to the rectilinear guide surfaces 161*a* and 161*b*, respectively, of the protruding portion 161 of the rectilinear guide member 16. The rectilinear guide portion 12*d* and 12*e* are key-coupled to the rectilinear guide surfaces 162*a* and 162*b*, respectively, of the protruding portion 162.

Here, the rectilinear guide portions 3*a* and 3*b* of the forwardly and backwardly movable cylinder 3 key-coupled to the rectilinear guide surfaces 161*a* and 161*b*, respectively, of the rectilinear guide member 16, and the rectilinear guide portions 12*b* and 12*c* of the second lens holding member 12 key-coupled to the aforementioned rectilinear guide surfaces 161*a* and 161*b*, respectively, differ in the distance from the center line in the direction of the optical axis (the center of the optical axis) from one another. That is, the distance from the center of the optical axis to the rectilinear guide portions 3*a* and 3*b* (the distance in the radial direction) is set longer than the distance from the center of the optical axis to the rectilinear guide portions 12*b* and 12*c* (the distance in the radial direction).

Also, the rectilinear guide portions 3*c* and 3*d* of the forwardly and backwardly movable cylinder 3 key-coupled to the rectilinear guide surfaces 162*a* and 162*b*, respectively, of the rectilinear guide member 16, and the rectilinear guide portions 12*d* and 12*e* of the second lens holding member 12 key-coupled to the aforementioned rectilinear guide surfaces 162*a* and 162*b*, respectively, differ in the distance from the center of the optical axis from one another. That is, the distance from the center of the optical axis to the rectilinear guide portions 3*c* and 3*d* (the distance in the radial direction) is set longer than the distance from the center of the optical axis to the rectilinear guide portions 12*d* and 12*e* (the distance in the radial direction).

In other words, the protruding portions 161 and 162 of the rectilinear guide member 16 and the rectilinear guide portions 3*a* to 3*d* of the forwardly and backwardly movable cylinder 3 are key-coupled together at positions different in the distance from the center of the optical axis from each other, and the protruding portions 161 and 162 of the rectilinear guide member 16 and the rectilinear guide portions 12b to 12e of the second lens holding member 12 are key-coupled together at positions different in the distance from the center of the optical axis from each other. The rectilinear guide portions 3a to 3d of the forwardly and backwardly movable cylinder 3 and the rectilinear guide portions 12b to 12e of the second lens holding member 12 are capable of overlapping each other in the forward and backward movement stroke in the direction of the optical axis (overlapping each other in the direction of the optical axis).

FIG. 7 is a perspective view showing a state in which the first unit lens driving portion 2 of the lens barrel has been mounted on the forwardly and backwardly movable cylinder 3. FIG. 8 is a perspective view of the first unit lens driving portion 2 as it is viewed from another direction. In FIG. 7, the forwardly and backwardly movable cylinder 3 is shown in a partly cut state.

In FIGS. 7 and 8, a mechanism portion constituting the first unit lens driving portion 2 includes a guide member 202, a screw member 203, a nut member 204, a spring member 205, a gear member 206, a stepped gear member 207, a stepping motor 208 and a gear member 209. Also, a first lens holding member 201 constituting the first unit lens driving portion 2 includes a main guide portion 201a, an auxiliary guide portion 201b, a receiving portion 201c and a rotation stopping portion 201d. On the other hand, the forwardly and backwardly movable cylinder 3 includes a guide shaft portion 3e engaged with the auxiliary guide portion 201b of the first lens holding member 201.

The guide member 202 is engaged with the main guide portion 201a of the first lens holding member 201 to thereby guide the first lens holding member 201 in the direction of the optical axis, and is sandwiched between and fixed by the forwardly and backwardly movable cylinder 3 and the first base plate member 5. The screw member 203 is provided with a gear portion 203a and a screw portion 203b. The nut member 204 is screw-coupled to the screw portion 203b of the screw member 203, and is mounted on the receiving portion 201c of the first lens holding member 201, and is rotation-restricted by the rotation stopping portion 201d of the first lens holding member 201.

The spring member 205 is disposed on the outer peripheral side of the main guide portion 201a of the first lens holding member 201, and biases the first lens holding member 201 and the nut member 204 toward the screw portion 203b of the screw member 203. The gear member 206 is gear-coupled to the gear portion 203a of the screw member 203. The stepped gear member 207 is gear-coupled to the gear member 206. The stepping motor 208 is mounted on the forwardly and backwardly movable cylinder 3 through a mounting portion 208a. The gear member 209 is press-fitted into and fixed to the rotary shaft of the stepping motor 208, and is gear-coupled to the stepped gear member 207.

Figure 10:
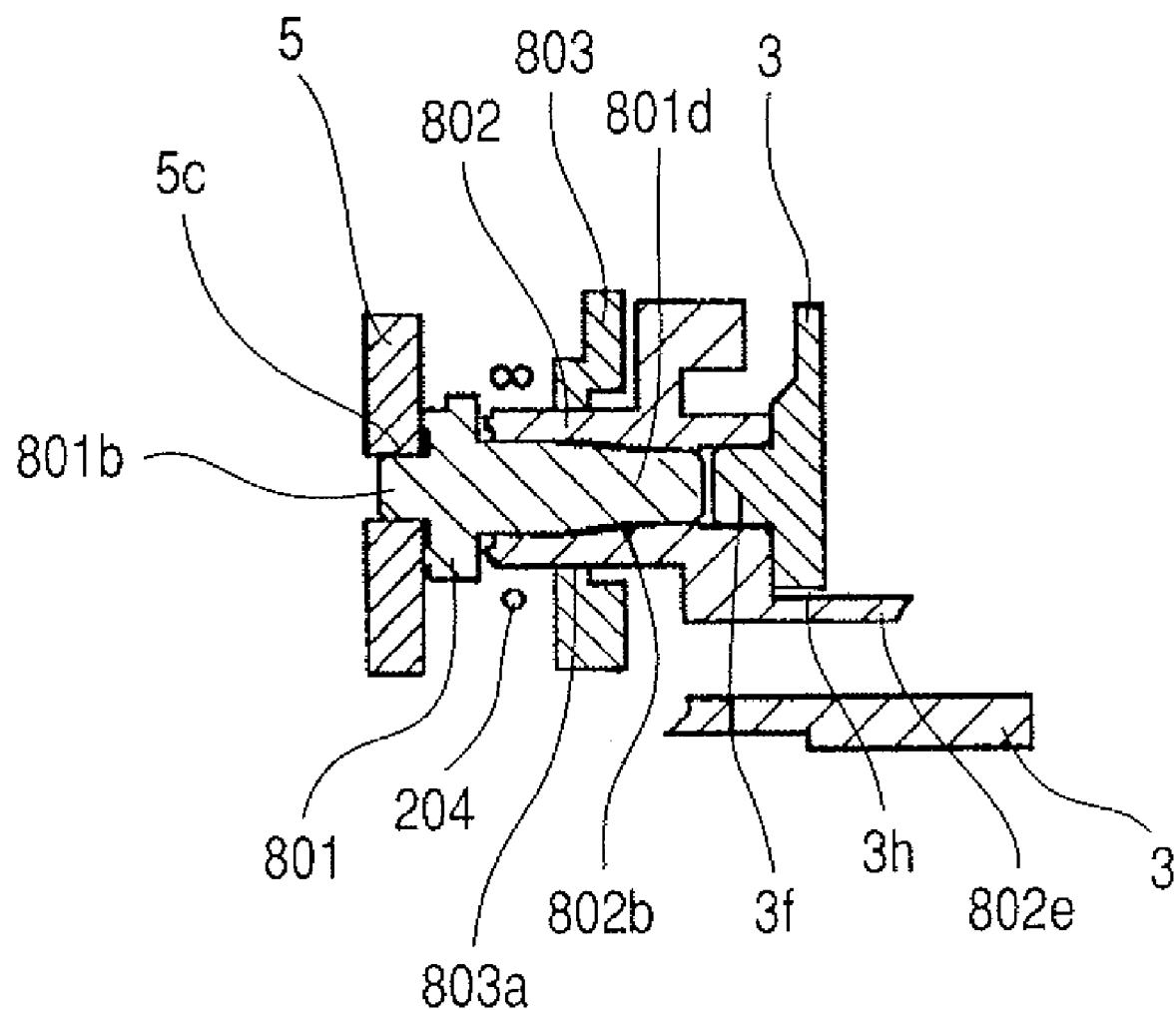
FIG. 10 is a cross-sectional view showing the construction of the barrier driving portion.

FIG. 9 is an exploded perspective view showing the detailed construction of the barrier driving portion 8 of the lens barrel. FIG. 10 is a cross-sectional view showing the construction of the barrier driving portion 8. In FIG. 9, the forwardly and backwardly movable cylinder 3 is shown in a partly cut state.

In FIGS. 9 and 10, the barrier driving portion 8 drives to open and close the barrier members 6 and 7, and includes a first barrier driving member 801, a second barrier driving member 802, a second base plate member 803, a first spring member 804 and a second spring member 805.

The barrier member 6 is mounted pivotally relative to the first base plate member 5 by the shaft portion 5a of the first base plate member 5 being inserted into the aperture portion 6a. The barrier member 7 is mounted pivotally relative to the first base plate member 5 by the shaft portion 7a thereof being inserted into the aperture portion 5b of the first base plate member 5. The barrier member 6 and the barrier member 7 are gear-coupled together by their respective gear portion 6b and gear portion 7b.

The first barrier driving member 801 includes a convex portion 801a extending through the slot portion 5d of the first base plate member 5 and connected to the slot portion 6c of the barrier member 6, a shaft portion 801b pivotally engaged with the aperture portion 5c of the first base plate member 5, and spring hooking portion 801c. The second barrier driving member 802 includes an inner diameter portion 802a (not shown) for pivotally supporting the shaft portion 3f of the forwardly and backwardly movable cylinder 3, an inner diameter portion 802b for supporting the first barrier driving portion 801, spring hooking portions 802c and 802d, a lever arm portion 802e and a notched portion 802f. The lever arm portion 802e extends through the aperture portion 3h of the forwardly and backwardly movable cylinder 3 (see FIG. 10).

The second base plate member 803 is provided with an aperture portion 803a engaged with the outer peripheral portion of the second barrier driving member 802 and pivotally supporting the same member 802, and an aperture portion 803b through which the spring hooking portion 802c of the second barrier driving member 802 extends. The first barrier member 804 is disposed coaxially with the first barrier driving member 801 and the second barrier driving member 802 and on the outer diameter side of the second barrier driving member 802. The first spring member 804 is hooked on the spring hooking portion 801c of the first barrier driving member 801 and the spring hooking portion 802c of the second barrier driving member 802, and connects the first barrier driving member 801 and the second barrier driving member 802 together.

The first barrier driving member 801 and the second barrier driving member 802 connected together by the first spring member 804 are rotatable relative to each other with the convex portion, not shown, of the first barrier driving member 801 fitted in the notched portion 802f of the second barrier driving member 802. The first barrier driving member 801 and the second barrier driving member 802 are designed to be pivotally movable relative to each other by an amount corresponding to the angle of the notched portion 802f only when a force in a direction to charge the first spring member 804 is applied.

The second spring member 805 is hooked on the spring hooking portion 802d of the second barrier driving member 802 and the convex portion 3g of the forwardly and backwardly movable cylinder 3, and biases the first barrier driving member 801 and the second barrier driving member 802 connected together by the first spring member 804 in a clockwise direction (a barrier opening direction).

Figure 11:
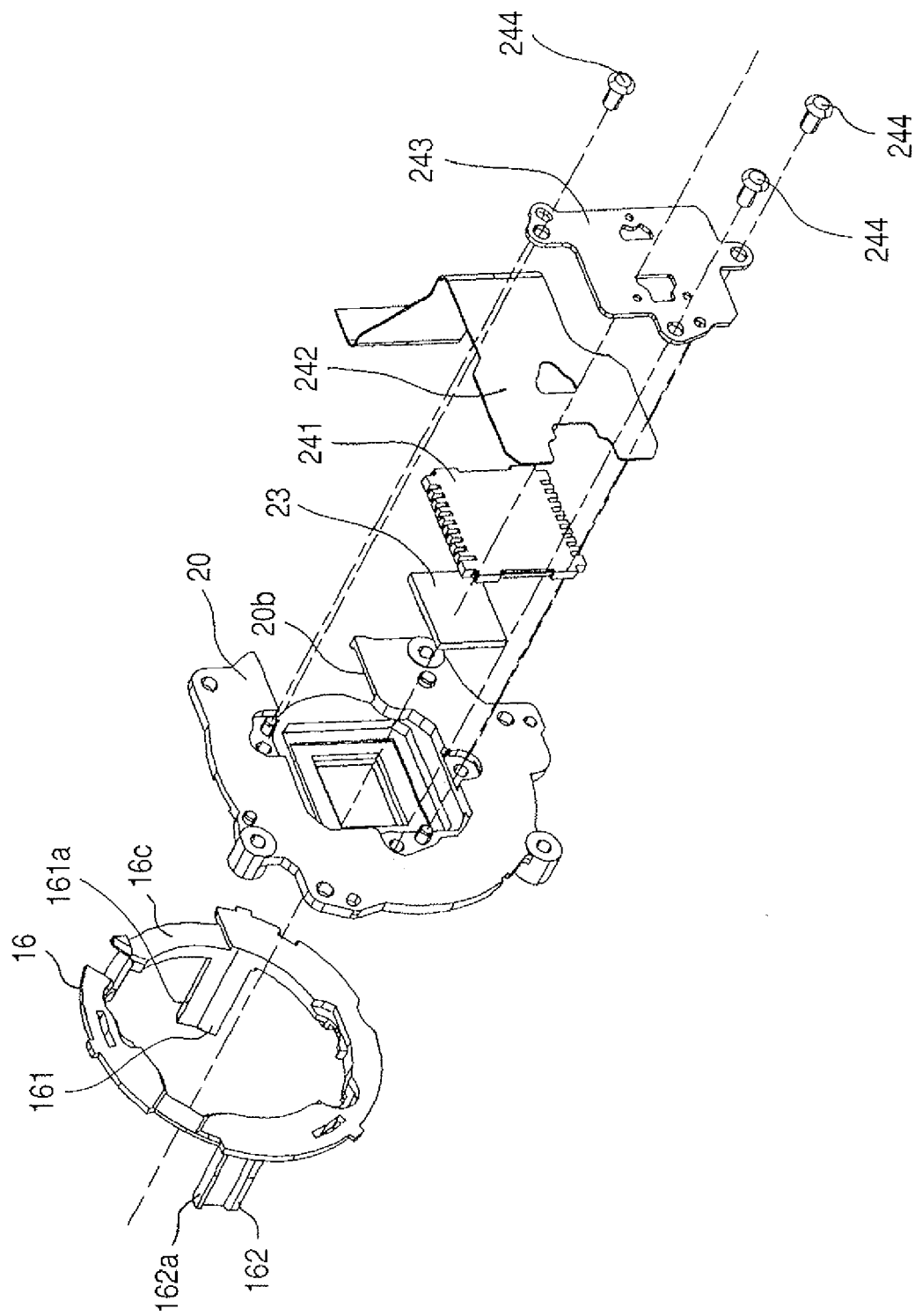
FIG. 11 is an exploded perspective view showing the detailed construction of a CCD unit mounted on the lens barrel.

FIG. 11 is an exploded perspective view showing the detailed construction of the CCD unit 24 mounted on the lens barrel.

In FIG. 11, the CCD unit 24 is provided with a CCD 241, a CCD flexible substrate (hereinafter referred to as the CCD FPC) 242, a plate member 243 and a screw 244.

The CCD 241 is an image pickup element for photoelectrically converting the optical image of an object imaged through the first lens unit 1 and the second lens unit 11 which are photo-taking lenses into an image signal. The CCD FPC 242 is a substrate to which the CCD 241 is soldered and which is disposed on the rear end side of the lens barrel in the direction of the optical axis, and is for supplying the photoelectrically converted image signal to an image processing circuit provided on the camera main body, not shown. The CCD FPC 242 to which the CCD 241 is soldered is fixed to the plate member 243 by a method such as adhesive securing. The plate member 243 is fixed to the fixed base plate member 20 by screws 244.

The various operations of the lens barrel according to the present embodiment constructed as described above will now be described in detail with reference to FIGS. 1 to 11 described above and FIGS. 12 to 19.

The forward and backward movement of the whole lens barrel will first be described.

Figure 12:
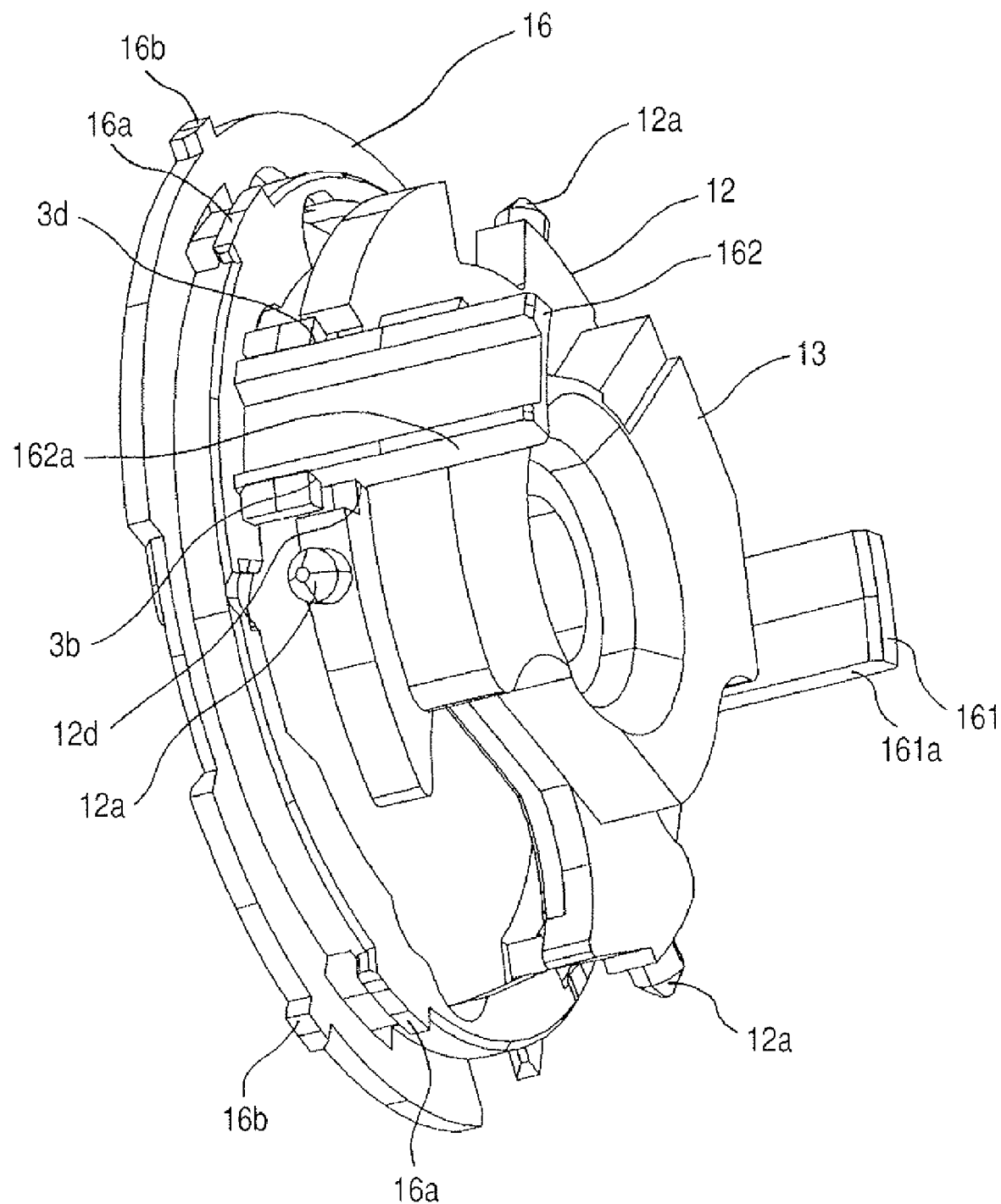
FIG. 12 shows the key-coupled state of the forwardly and backwardly movable cylinder in the stored position state and the rectilinear guide member of the second lens holding member.
Figure 13:
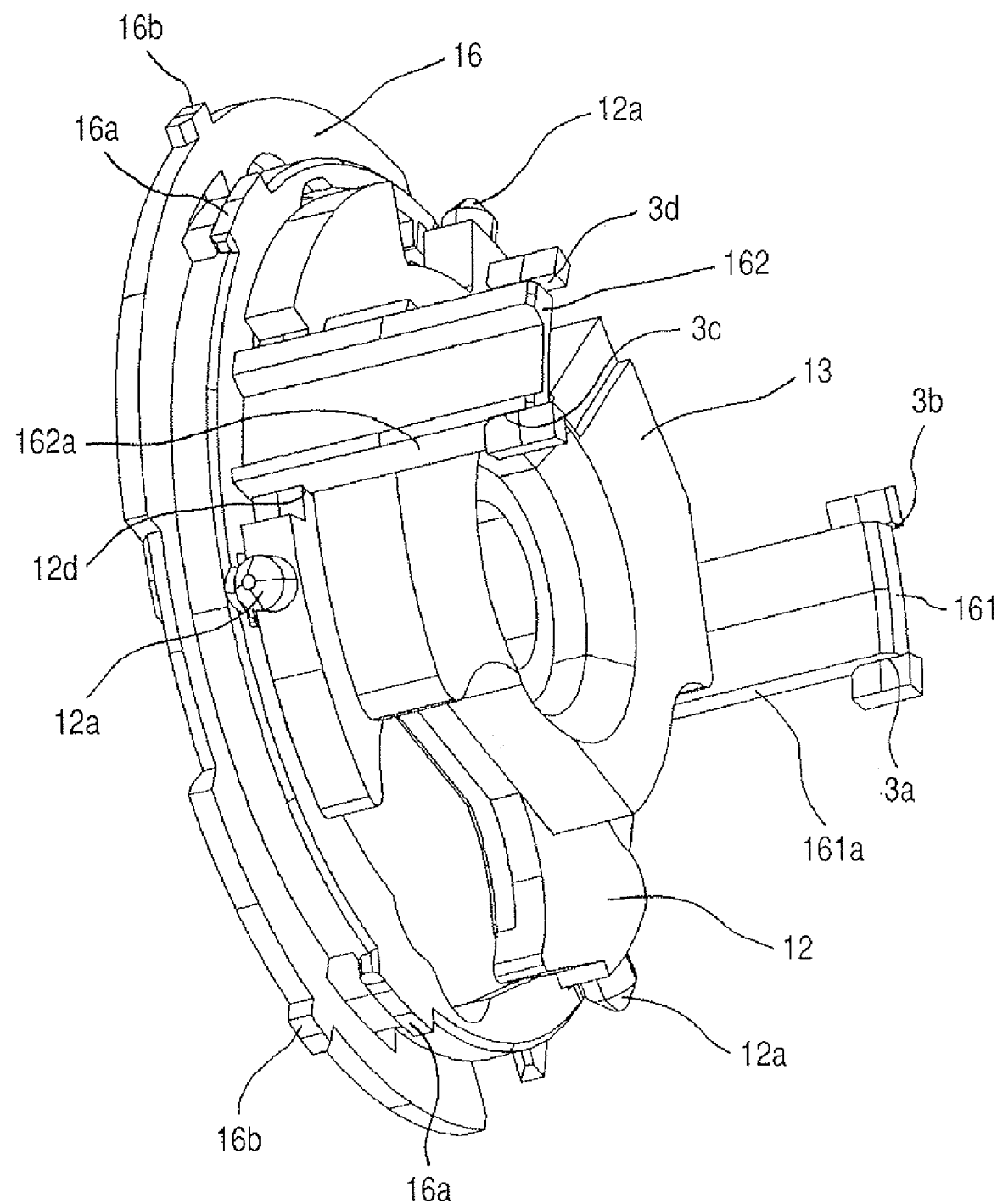
FIG. 13 shows the key-coupled state of the forwardly and backwardly movable cylinder in the WIDE position state and the rectilinear guide member of the second lens holding member.
Figure 14:
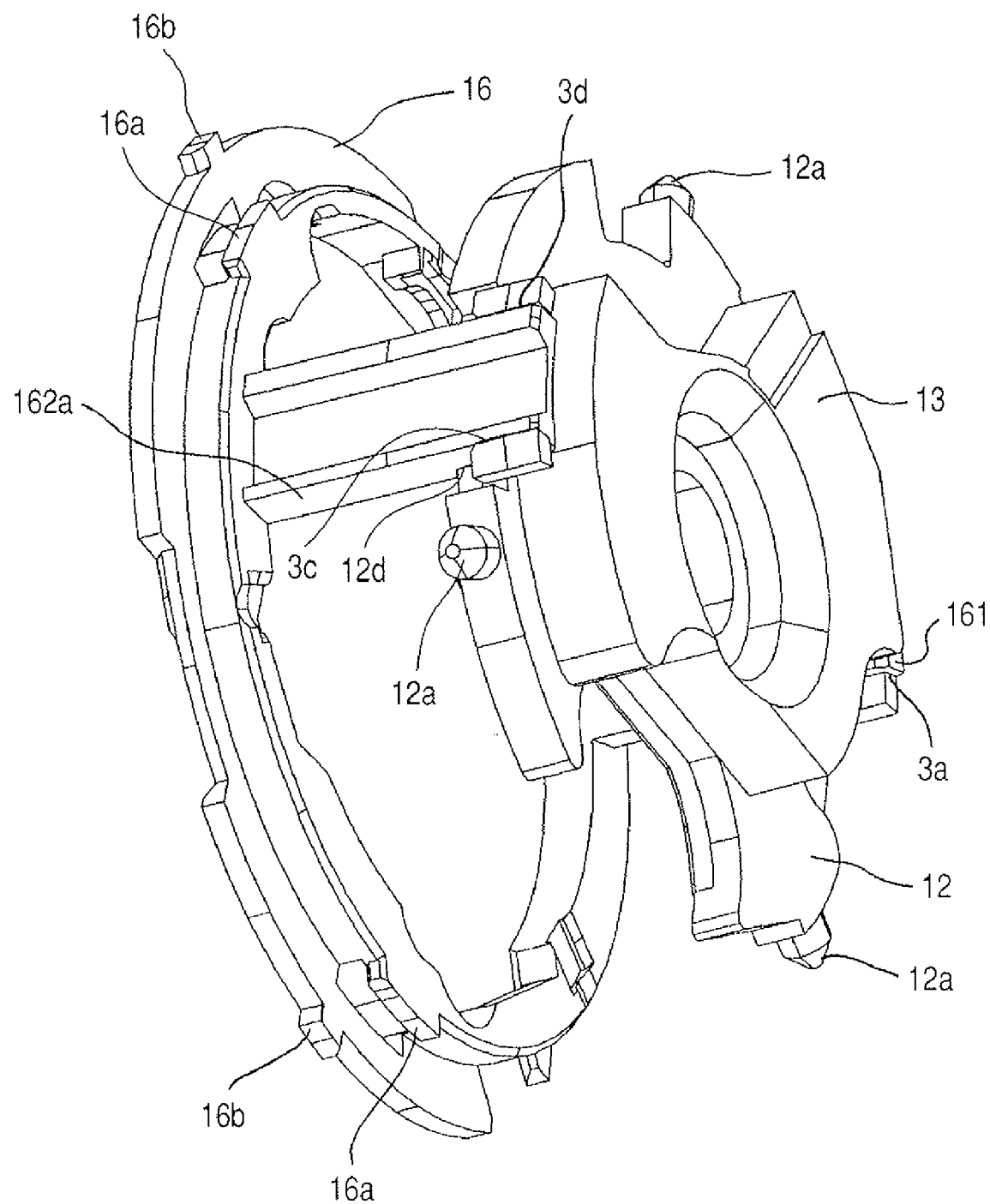
FIG. 14 shows the key-coupled state of the forwardly and backwardly movable cylinder in the TELE position state and the rectilinear guide member of the second lens holding member.

FIG. 12 shows the key-coupled state of the forwardly and backwardly movable cylinder 3 and the rectilinear guide member 16 of the second lens holding member 12 in a stored position state. FIG. 13 shows the key-coupled state of the forwardly and backwardly movable cylinder 3 and the rectilinear guide member 16 of the second lens holding member 12 in the WIDE position state. FIG. 14 shows the key-coupled state of the forwardly and backwardly movable cylinder 3 and the rectilinear guide member 16 of the second lens holding member 12 in the TELE position state. In FIGS. 12 to 14, the forwardly and backwardly movable cylinder 3 is shown with respect only to the rectilinear guide portions 3a, 3b, 3c and 3d thereof.

In FIGS. 1 to 4 and FIGS. 12 to 13, in a state in which the lens barrel is in the stored position shown in FIG. 2, the recess 16c of the rectilinear guide member 16 has been moved into (retracted to) a position adjacent and opposed to the CCD FPC 242. By the structure in which the recess 16c is disposed in the rectilinear guide member 16, it is possible to secure a movement space for the CCD FPC 242 in the direction of the optical axis (the leftward direction in FIG. 2), and push the CCD FPC 242 toward the recess 16c side without applying any stress to the CCD FPC 242. When in this state, the gear member 21 is rotated by a drive source, not shown, the cam cylinder 17 is pivotally moved and also, is forwardly and backwardly moved in the direction of the optical axis along a cam locus, not shown, because the cam follower 18 of the cam cylinder 17 and the cam portion 19a of the fixed cylinder 19 are cam-coupled together.

At this time, the rectilinear guide member 16 becomes hindered from rotating about the optical axis by the engagement between the convex portion 16b of the rectilinear guide member 16 and the rectilinear guide groove portion 19b of the fixed cylinder 19. In this state, by the engagement between the convex portion 16a of the rectilinear guide member 16 and the groove portion 17b of the cam cylinder 17, the rectilinear guide member 16 and the cam cylinder 17 are integrally moved forwardly and backwardly in the direction of the optical axis.

When the cam cylinder 17 is pivotally moved, the forwardly and backwardly movable cylinder 3 becomes hindered from rotating about the optical axis, by the key-coupling of the rectilinear guide portions 3a, 3b of the forwardly and backwardly movable cylinder 3 and the rectilinear guide surfaces 161a, 161b of the protruding portion 161 of the rectilinear guide member 16, and the key-coupling of the rectilinear guide portions 3c, 3d of the forwardly and backwardly movable cylinder 3 and the rectilinear guide surfaces 162a, 162b of the protruding portion 162. In this state, the forwardly and backwardly movable cylinder 3 is moved forwardly and backwardly in the direction of the optical axis along a cam locus, not shown, by the coupling of the cam follower 4 of the forwardly and backwardly movable cylinder 3 and the cam portion 17c of the cam cylinder 17.

Likewise, the second lens holding member 12 becomes hindered from rotating about the optical axis, by the key-coupling of the rectilinear guide portions 12b, 12c and the rectilinear guide surfaces 161a, 161b of the protruding portion 161 of the rectilinear guide member 16, and the key-coupling of the rectilinear guide portions 12d, 12e and the rectilinear guide surfaces 162a, 162b. In this state, the second lens holding member 12 is moved forwardly and backwardly in the direction of the optical axis along a cam locus, not shown, by the coupling of the cam follower portion 12b of the second lens holding member 12 and the cam portion 17d of the can cylinder 17.

Thereby, the lens barrel (photo-taking lens) changes from the stored position state shown in FIG. 2 to the WIDE position state which is the photographing position shown in FIG. 3. Further, the lens barrel (photo-taking lens) is zoom-operated from the WIDE position state shown in FIG. 3 to the TELE position state which is the photographing position shown in FIG. 4. In this case, the forwardly and backwardly movable cylinder 3, as described above, is moved forwardly and backwardly in the direction of the optical axis, whereby as shown in FIGS. 12 to 14, it is set to the stored position state, the WIDE position state and the TELE position state, respectively.

Description will now be made of the focusing operation in the lens barrel.

When electric power is supplied from a power source, not shown, to the stepping motor 208 (FIG. 8) of the barrier driving portion 8 through wiring in a predetermined electrical energization pattern, the gear member 209 is rotated in a predetermined direction, and the rotating force thereof is successively transmitted to the stepped gear member 207, the gear member 206 and the gear portion 203a, and the screw member 203 is rotated. When the screw member 203 is rotated, the rotating force is transmitted to the nut member 204. The nut member 204 and the first lens holding member 201 are biased toward the screw portion 203b by the spring member 205 and therefore are integrally moved forwardly and backwardly in the direction of the optical axis.

As described above, the position of the first lens unit 1 in the direction of the optical axis is moved, whereby the focusing operation is performed. In this case, the focusing operation is performed only when the lens barrel is in the above-described photographing position.

Description will now be made of the barrier opening and closing operation in the lens barrel.

Figure 15:
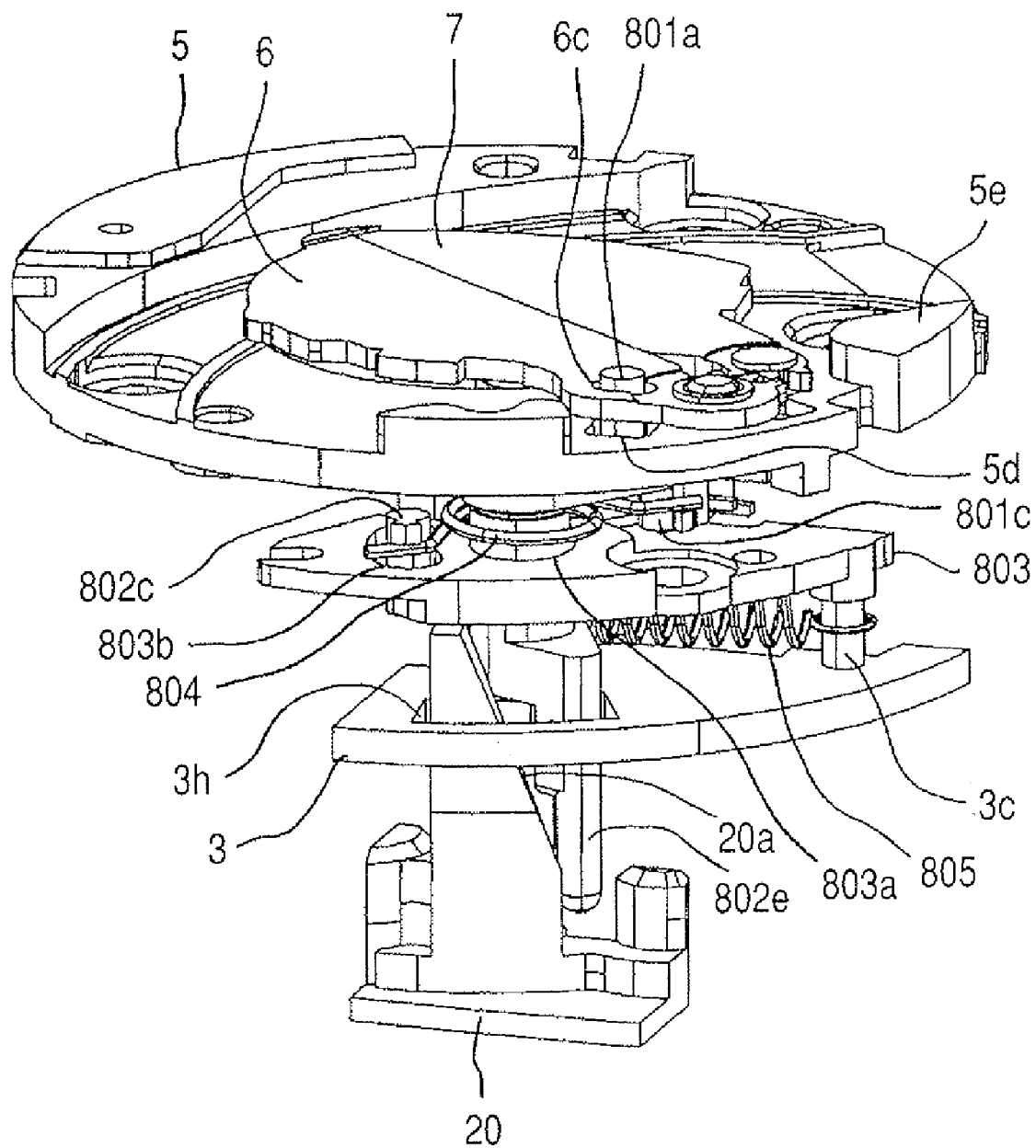
FIG. 15 is a perspective view showing the barrier driving portion in a barrier closed state.
Figure 16:
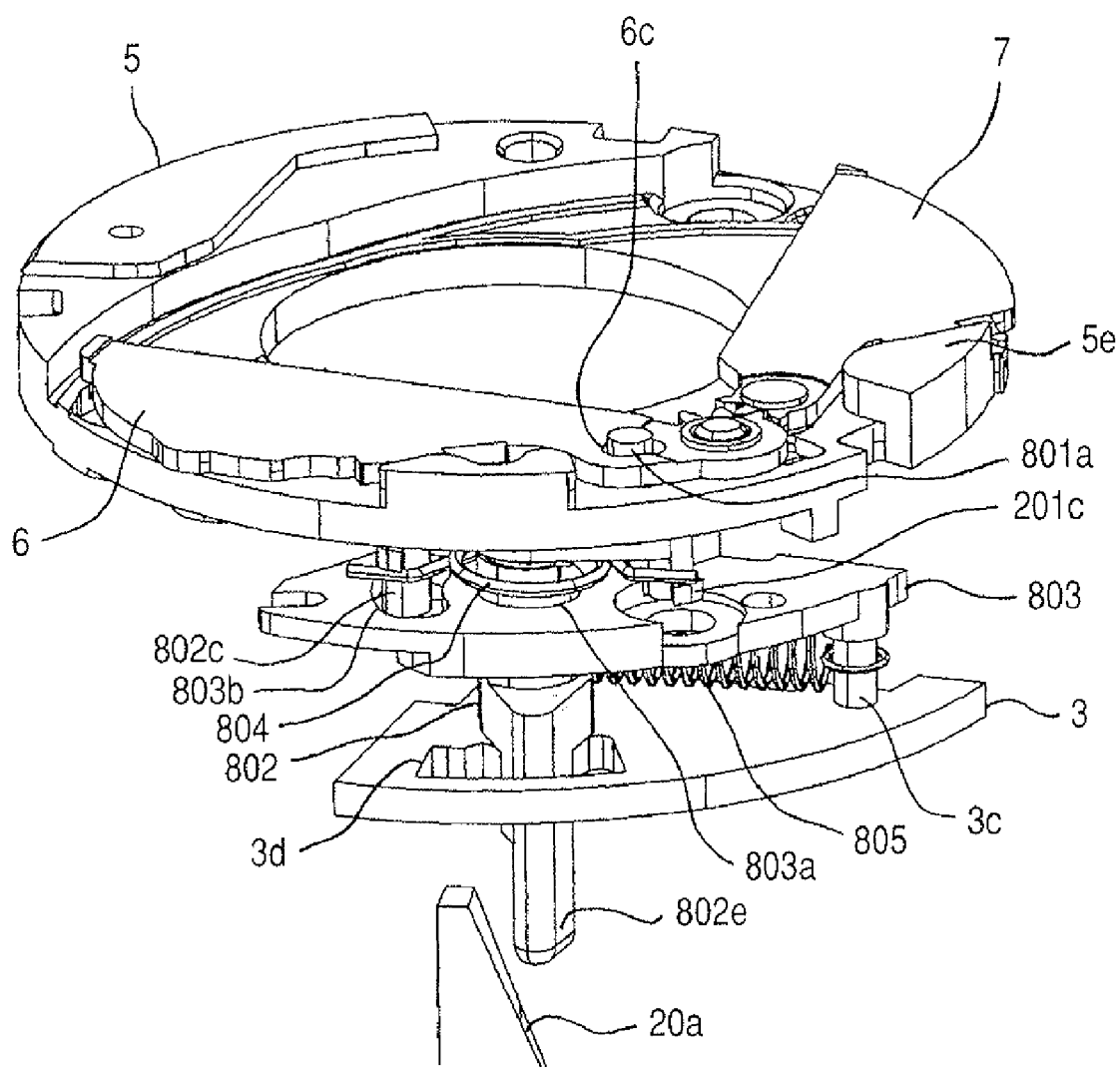
FIG. 16 is a perspective view showing the barrier driving portion in a barrier opened state.
Figure 17:
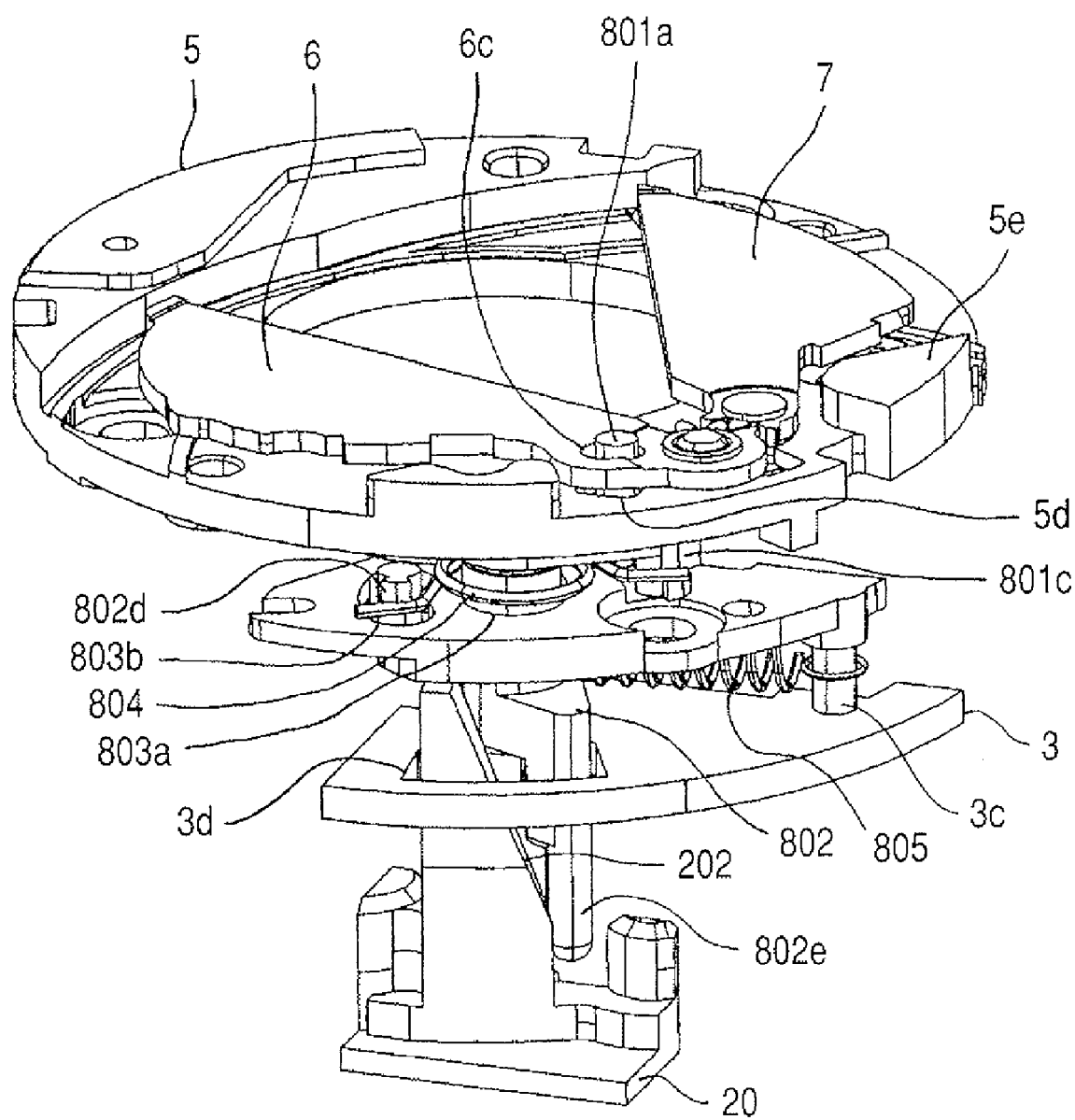
FIG. 17 is a perspective view showing the barrier driving portion in a state in which an extraneous force has been applied in a direction to open a barrier member.
Figure 18:
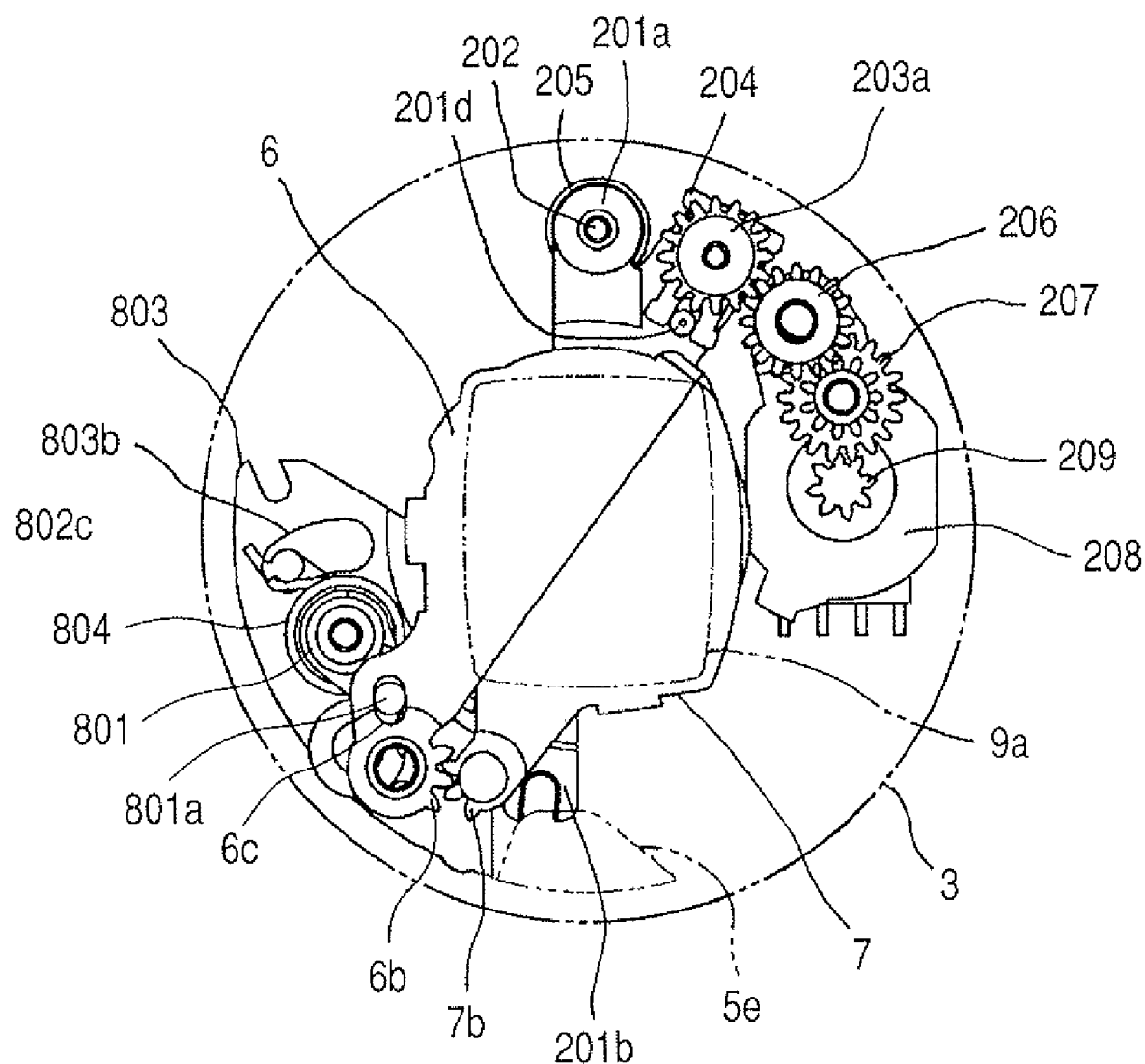
FIG. 18 is a front view showing the barrier closed state.
Figure 19:
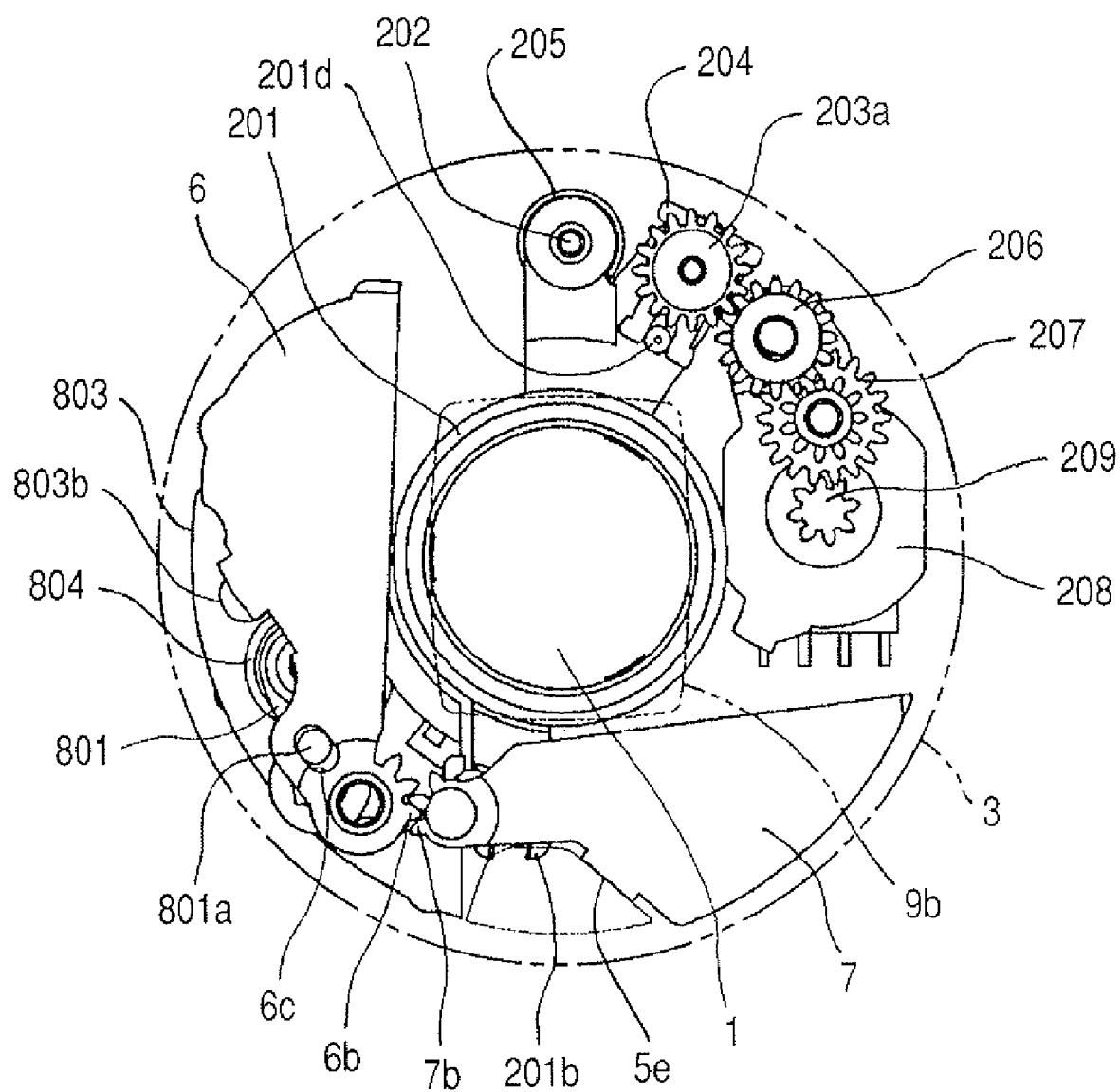
FIG. 19 is a front view showing the barrier opened state.

FIG. 15 is a perspective view showing the barrier driving portion 8 in a barrier closed state. FIG. 16 is a perspective view showing the barrier driving portion 8 in a barrier opened state. FIG. 17 is a perspective view showing the barrier driving portion 8 in a state in which an extraneous force has been applied in a direction to open the barrier members 6 and 7. FIG. 18 is a front view showing the barrier closed state. FIG. 19 is a front view showing the barrier opened state. In FIGS. 15 to 17, the forwardly and backwardly movable cylinder 3 and the fixed base plate member 20 are only partly shown.

In FIGS. 15 to 19, first, in the stored position of the lens barrel, the barrier is in the closed state (FIGS. 15 and 18). At this time, the second barrier driving member 802 of the barrier driving portion 8 is being rotated in a counter-clockwise direction because the lever arm portion 802e abuts against the barrier cam portion 20a of the fixed base plate member 20 to thereby charge the second spring member 805. The first barrier driving member 801 connected to the second barrier driving member 802 by the first spring member 804 is also being rotated in the counter-clockwise direction.

The barrier member 6 is connected to the first barrier driving member 801 by the convex portion 801a of the first barrier driving member 801 being inserted into the slot portion 6c and therefore, is rotated in a clockwise direction about the aperture portion 6a (FIG. 9). Also, the barrier member 7 is rotated in a counter-clockwise direction about the shaft portion 7a (FIG. 9) because the gear portion 7b is gear-coupled to the gear portion 6b of the barrier member 6. Thereby, the barrier closed state is brought about (FIG. 15).

When in such a barrier closed state, for example, an unexpected extraneous force in a direction to open the barrier members 6 and 7 is applied the first barrier driving member 801 is rotated in a clockwise direction. Here, as described above, the first barrier driving member 801 and the second barrier driving member 802 connected together by the first spring member 804 are pivotally movable relative to each other in a direction to charge the first spring member 804 by an amount corresponding to the angle of the notched portion 802f. Thereby, the first spring member 18 is charged, whereby the occurrence of unreasonableness in mechanism is absorbed and avoided (FIG. 17).

Next, when the lens barrel assumes the photographing position, the barrier opened state is brought about (FIGS. 16 and 19). At this time, by the above-described forward and backward movement of the entire lens barrel, the lever arm portion 802e of the second barrier driving member 802 is released from its abutting state against the barrier cam portion 20a of the fixed base plate member 20, with the movement of the forwardly and backwardly movable cylinder 3 in the direction of the optical axis (from the stored position to the photographing position). Along therewith, the second barrier driving member 802 is rotated in the bias direction of the second spring member 805 (a clockwise direction). The first barrier driving member 801 connected to the second spring member 805 by the first spring member 804 is also rotated in the clockwise direction.

The barrier member 6 is connected to the first barrier driving member 801 by the convex portion 801a of the first barrier driving member 801 being inserted into the slot portion 6c and therefore is rotated in a counter-clockwise direction about the aperture portion 6a. Also, the barrier member 7 is rotated in a clockwise direction about the shaft portion 7a because the gear portion 7b is gear-coupled to the gear portion 6b of the barrier member 6. Thereby, the convex portion 5e provided on the first base plate member 5 abuts against the side surface of the barrier member 7, and the barrier opened state is brought about (FIG. 16).

As described above, according to the present embodiment, design is made and that the CCD 241 is soldered to the CCD EPC 242 and is disposed on the rear end side of the lens barrel in the direction of the optical axis and also, the image signal photoelectrically converted by the CCD 241 is supplied to the image processing circuit provided on the camera main body side, not shown. Also, design is made such that in the stored state of the lens barrel, the rectilinear guide member 16 is moved (retracted) to a position in which the recess 16c of the rectilinear guide member 16 is adjacent to the CCD FPC 242. Thereby, it becomes possible to shorten the retracted length which is the length of the lens barrel in the stored state thereof in the direction of the optical axis.

Also, the recess 16c is formed in the rectilinear guide member 16 as described above and therefore, it becomes possible to secure a space in which the CCD FPC 242 disposed on the rear end side of the lens barrel in the direction of the optical axis can be moved in the direction of the optical axis (the direction toward the recess 16c side of the rectilinear guide member 16). Thereby, it becomes possible to easily correct the deviation of the imaging position due to the manufacturing error or the like of the lens barrel.

The above-described embodiment is merely exemplary of the present invention, and is not construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-216062, filed Jul. 26, 2005 which is hereby incorporated by reference herein in its entirety.

What is claimed is:

1. A lens barrel on which a flexible substrate having mounted thereon an image pickup element for photoelectrically converting an optical image imaged by a photo-taking lens is mounted, comprising:
    a lens barrel member disposed movable forward and backward in the direction of an optical axis, and moving the photo-taking lens between a stored position which is the image pickup element side in the direction of the optical axis and a photographing position which is an object side in the direction of the optical axis; and
    an image pickup element supporting unit for supporting the image pickup element, the image pickup element supporting unit having a notched portion so that the lens barrel member may face the flexible substrate.

2. A lens barrel according to claim 1, wherein said lens barrel member retracted to a position adjacent to said flexible substrate has a recess disposed in a portion opposed to said flexible substrate.

3. A lens barrel according to claim 1, wherein said lens barrel member includes a first lens barrel member for holding a first photo-taking lens as said photo-taking lens, a second lens barrel member for holding a second photo-taking lens as the photo-taking lens, and a third lens barrel member for guiding the first lens barrel member and the second lens barrel member in the direction of the optical axis, and the third lens barrel member is the lens barrel member retracted to a position adjacent to said flexible substrate.

4. An image pickup apparatus provided with a lens barrel according to claim 1.

* * * * *